No. 826,688. PATENTED JULY 24, 1906.
G. H. POOR & H. STABELL.
TRUCK AND BOLSTER MECHANISM.
APPLICATION FILED MAR. 6, 1905.
2 SHEETS—SHEET 2.
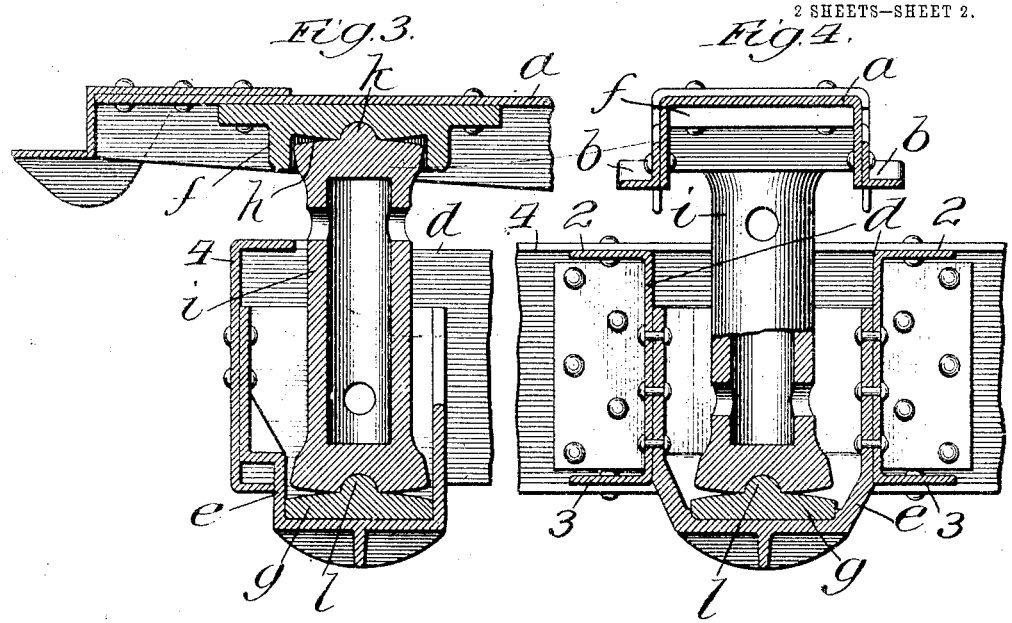
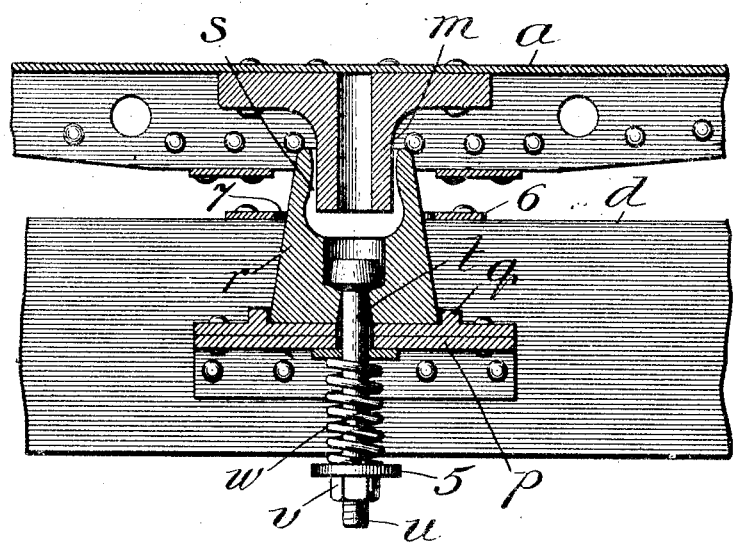
Witnesses:
Inventors:
George H. Poor,
Halvdan Stabell,
By Thomas F. Sheridan,
Atty.

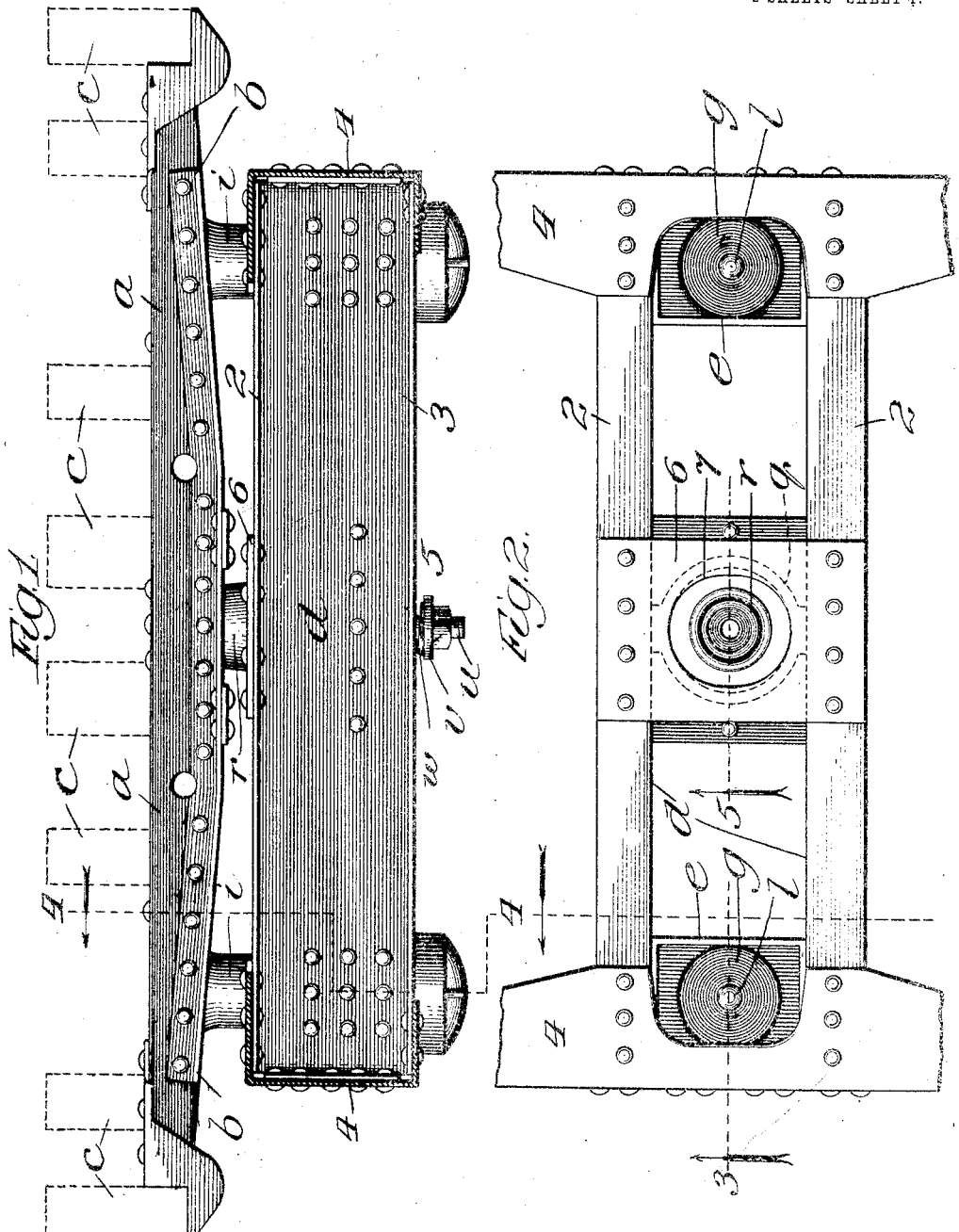

UNITED STATES PATENT OFFICE.

GEORGE H. POOR AND HALVDAN STABELL, OF CHICAGO, ILLINOIS, ASSIGNORS TO SAMUEL W. McMUNN, OF CHICAGO, ILLINOIS.

TRUCK AND BOLSTER MECHANISM.

No. 826,688.      Specification of Letters Patent.      Patented July 24, 1906.

Application filed March 6, 1905. Serial No. 248,671.

*To all whom it may concern:*

Be it known that we, GEORGE H. POOR and HALVDAN STABELL, citizens of the United States, residing at Chicago, Illinois, have invented certain new and useful Improvements in Truck and Bolster Mechanisms, of which the following is a specification.

This invention relates to that class of body-bolsters and truck mechanisms used in connection with railway-cars.

It relates particularly to the side bearing mechanism by which the desired flexure may be obtained between the parts when the car is taking curves and when stopping and starting the car.

It relates, further, to the centering mechanism by means of which the desired freedom of movement of the truck with relation to the car-body in all directions both longitudinally and transversely is rendered possible and whereby the truck and car-body are centered or brought back to and yieldingly maintained in normal position, and the ordinary truck-bolster and center supporting-bearing dispensed with.

The principal object of the invention is to provide a simple, economical, and efficient body-bolster and truck mechanism for railway-cars comprising side bearings and centering mechanism adapted to permit the desired freedom of movement of the truck and car-body with relation to each other in all directions both longitudinally and transversely, so as to minimize the shocks and strains to the truck when stopping and starting the car, permit it to readily adjust itself to the curves of the track, and automatically center the truck and car or bring them to normal centered position by the action of the weight of the car upon the side bearings in connection with the operation of the centering mechanism.

A further object is to dispense with the usual truck-bolster and center supporting-bearing.

A further object is to provide a bolster of this character with simple, economical, and efficient side bearings.

Other and further objects will appear from an examination of the drawings and the following description and claims.

The invention consists in the features, combinations, and details of construction hereinafter described and claimed.

In the accompanying drawings, Figure 1 is a cross-sectional elevation taken through a car, showing the bolster and transom mechanism in elevation and the underframing in dotted outline; Fig. 2, a plan view of the same; Fig. 3, an enlarged sectional detail taken on line 3 of Fig. 2 looking in the direction of the arrow; Fig. 4, an enlarged sectional detail taken through the mechanism on line 4 of Fig. 1 looking in the direction of the arrow; and Fig. 5, a similar view showing the centering mechanism, taken on line 5 of Fig. 2.

In illustrating and describing these improvements we will only herein illustrate and describe that which we consider to be new, taken in connection with so much that is old as will properly disclose the invention to others and enable those skilled in the art to practice the same, leaving out of consideration other and well-known mechanisms which if set forth herein would only tend to confusion, prolixity, and ambiguity.

In constructing a bolster and truck mechanism in accordance with these improvements we provide a body-bolster, preferably formed of an upper inverted-U-shaped portion $a$, made of metal and cambered at its lower surface from the center to each end, which lower surface is provided with metal angle-bars $b$. This body-bolster is secured to the usual longitudinal sills $c$ in any desired or well-known manner and supports such sills.

To dispense with the usual truck-bolster and center supporting-bearing is, as already suggested, one of the objects of our invention, and in order to accomplish this transom mechanism is provided, consisting of transom side portions $d$, each preferably formed of sheet metal having upper flanges 2 and lower flanges 3 and secured at each end to the side frames 4 of the truck, such side frames being formed of vertical side and horizontal upper and lower integral portions secured firmly to the ends of the transoms, so as to form therewith a strong and rigid truck-frame. The truck-frame is provided at or near each end of each transom with cup-shaped side bearing-pockets $e$, formed, preferably, of chilled cast-iron and secured to the transom by means of rivets. These side bearing-pockets are each provided with detachable convex or parti-spherical bearing-blocks $g$ at the bottom thereof, which may be removed whenever desired or necessary. The under portion of the body-bolster is provided at or near each end with cast-metal inverted-cup-shaped portions $f$, arranged immediately above the truck or transom side pockets, each having convex or parti-spherical bearing-surfaces $h$ of the same curvature as those of the transom side bearing-blocks above described.

Arranged between each of the side bearings of the body-bolster and those of the truck or transoms are vertical supporting rocker-bars $i$, the upper and lower surfaces of each of which are convex, so as to engage the convex bearing-surfaces of the body-bolster and transom side bearings, respectively. The engaging surfaces of the upper and lower ends of these supporting rocker-bars are of the same curvature as that of the convex bearing-blocks which they engage, although this curvature may be varied somewhat. The curvature should, however, be such that the complete sphere of which it forms a section would greatly exceed in diameter the length of the rocker-bar. By this means the rocking of the bar in any direction will raise the body-bolster or car, with the result that the weight of the car will at all times tend to force the rocker-bars to normal vertical position and maintain the truck and car yieldingly in normal position. To assist these rocker-bars in holding their positions in the respective bearings, the upper portions are provided with parti-spherical projections $k$, which extend into corresponding sockets in the side bearings of the body-bolster. The upper portions of the blocks of the transom side bearings are provided with parti-spherical projections $l$, each of which engages corresponding recesses in the adjacent parts of the supporting rocker-bars and assists in retaining the parts in operative position. These projections also increase the bearing-surface when in normal position.

To further assist in holding the parts in their relative positions and at the same time permit the necessary flexure or movements thereof, the body-bolster is provided with a centrally-arranged king-bolt $m$, attached thereto by means of rivets or in any other desirable way, so as to depend from the upper body or web portion of such body-bolster.

It is desirable that the king-bolt, and thereby the body-bolster, should be so connected with the truck-frame or transom as to permit the movements of the car-body and truck in all directions, both longitudinally and transversely, within certain limits, as above suggested, and that the weight of the car should be supported upon the side bearings and not by means of the mechanism which connects the king-bolt with the truck, as hereinafter described. It is also desirable, as already suggested, to provide suitable means for centering the car and truck with relation to each other, or, in other words, for swinging the truck to normal position and maintaining it yieldingly in such position. In order to accomplish this, a centering-block $r$, provided with a circular central perforation or socket portion $s$, is mounted rockingly upon what we will term a "centering-block-supporting plate" $p$, which is secured to the transom of the truck and provided with an upwardly-extending annular flange $q$, adapted to form a guard or socket into which the lower end of the centering-block extends. This centering-block-supporting plate is provided with a central perforation through which a headed securing-pin $t$ extends. The upper head portion of this securing-pin is mounted in the socket of the centering-block and extends downward loosely through the bottom of such block and its supporting-plate $q$, as shown in Fig. 5. The lower end of this securing-pin is provided with a washer 5, and a compressible spring $w$ is mounted upon and encircles the securing-pin between such washer and the bottom of the centering-block-supporting plate. The washer, and thereby the spring, is held in place upon the pin by means of a nut $v$ upon the threaded end $u$ of such pin, and by turning the nut in the desired direction the tension of the spring may be readily regulated. The mouth of the socket portion of the centering-block is of sufficient dimensions, as already suggested, to permit a limited movement of the king-bolt therein, and the perforations in the bottom of the centering-block and its supporting-plate are of such diameter as to permit the securing-pin to extend loosely therethrough and have a limited amount of play to conform to the position of the centering-block. It will be seen that the securing-pin, with its nut and spring, is the means for connecting the centering-block to its support. The centering-block is therefore permitted to tilt or rock to a limited extent, conforming to the movement of the car. By this arrangement it will be readily seen that the initial movement of the body-bolster or car-body in any direction with relation to the truck will be yieldingly resisted by the centering-block and its spring mechanism. It will also be noted that the tendency of the spring when the centering-block is tipped in any direction will be to return such centering-block, and thereby the body-bolster and truck, to normal position.

By the above arrangement it will be seen that while the movement of the body-bolster and car-frame with relation to the truck is permitted in all directions, both longitudinally and transversely of the car, such movements are yieldingly resisted by the centering-block and its spring mechanism and also by reason of the curvature of the engaging surfaces between the ends of the rocker-bars and the side bearings of the body-bolster and transoms, respectively. It is necessary, however, that means be provided for positively limiting such movements and that the connections between the body-bolster and truck may effectually resist the severest shocks to which such cars are subject in operation. To accomplish this, the transom is provided with a top center plate 6, which forms a reinforcement or connecting member for the top center portions of the transom. This center plate is provided with a central perforation 7 for receiving the centering-block and serves as a flange for engaging the centering-block and positively limiting its movement in all directions both longitudinally and transversely of the car. The upper flanged portions of the side frames of the truck serve in a similar manner to positively limit any unusually extended movement of the rocker-bars laterally, such as might otherwise throw the parts out of operative position.

It will of course be understood that a plurality of trucks with bearings and bolster mechanism, as above described, are employed for each car and that all the side bearing mechanisms coöperate with each other and with the central centering devices in accomplishing the objects of the invention.

We claim—

1. In mechanisms of the class described, the combination of a body-bolster, a car-truck, a centering-block, and yielding means connecting the centering-block and truck, whereby the block is permitted to rock or tilt to a limited extent.

2. In mechanisms of the class described, the combination of a body-bolster, a car-truck provided with a transom, and a centering-block mounted upon the transom and having a resilient yielding connection with the body-bolster.

3. In mechanisms of the class described, the combination of a body-bolster, a car-truck provided with a transom, a centering-block mounted upon such transom and yieldingly connected with the body-bolster, and resilient means for yieldingly holding such centering-block in normal position while permitting it to be moved in any direction longitudinally or transversely of the car.

4. In mechanisms of the class described, the combination of a body-bolster, a car-truck provided with a transom, a centering-block mounted upon the transom and yieldingly connected with the body-bolster, and a spring connected with such centering-block for yieldingly holding it in normal position while permitting its movement against the tension of such spring mechanism.

5. In mechanisms of the class described, the combination of a body-bolster, a car-truck provided with a transom, a centering-block between the transom and body-bolster, a centering-block-supporting plate upon which such centering-block is mounted, and means connected with such centering-block for holding it yieldingly in position upon such supporting-plate.

6. In mechanisms of the class described, the combination of a body-bolster provided with a depending king-bolt, a car-truck provided with a transom, a centering-block movably mounted upon such transom beneath the body-bolster and provided with a central opening for loosely receiving such king-bolt, and resilient means for yieldingly securing such centering-block upon the transom.

7. In mechanisms of the class described, the combination of a body-bolster provided with a depending king-bolt, a car-truck provided with a transom, a centering-block movably mounted upon the transom beneath the body-bolster and provided with a central opening for loosely receiving such king-bolt therein, a supporting-plate for supporting such centering-block upon the transom, a securing-pin secured to such centering-block and extending through such block-supporting plate, and a spring connected with such securing-pin and in operative engagement with the block-supporting plate.

8. In mechanisms of the class described, the combination of a supporting-framework provided with body-bolster, a truck mounted beneath such supporting-framework and provided with side bearings, and a centering-block movably mounted upon such truck for yieldingly holding such body-bolster in operative position.

9. In mechanisms of the class described, the combination of a body-bolster and truck each provided with side bearings, and rocker-bars mounted between such side bearings, such rocker-bars and side bearings being provided with parti-spherical convex surface portions therebetween.

10. In mechanisms of the class described, the combination of a body-bolster and truck each provided with side bearings having convex bearing-surface portions, and rocker-bars mounted between such side bearings and provided with parti-spherical convex bearing-surface portions in contact with the convex bearing-surface portions of such side bearings respectively.

11. In mechanisms of the class described, the combination of a body-bolster and truck each provided with side bearings having convex bearing-surface portions, and rocker-bars mounted between such side bearings and provided with parti-spherical bearing-surfaces at each end thereof forming sections of a sphere of greater diameter than the length of such rocker-bars whereby the rocking of such bars in any direction longitudinally or transversely of the car will tend to raise the body-bolster and thereby the car-body.

12. In mechanisms of the class described, the combination of a body-bolster, a truck provided with transom mechanism having a central opening in its upper portion, and a centering-block extending through such central opening and yieldingly engaging such body-bolster.

13. In mechanisms of the class described, the combination of a body-bolster provided with a depending king-bolt, a truck provided with transom mechanism, a centering-block provided with an opening for receiving such king-bolt and movably mounted upon such transom mechanism, and an upper plate portion mounted upon such transom mechanism provided with a perforation through which such centering-block extends.

GEO. H. POOR.
HALVDAN STABELL.

Witnesses:
C. E. WILLIAMS,
MARQUIS EATON.